United States Patent [19]
Cox, Jr.

[11] 3,926,447
[45] Dec. 16, 1975

[54] COLLET-TYPE WORK HOLDER

[75] Inventor: Joseph Henry Cox, Jr., Cincinnati, Ohio

[73] Assignee: Cincinnati Milacron Inc., Cincinnati, Ohio

[22] Filed: Jan. 14, 1975

[21] Appl. No.: 540,910

[52] U.S. Cl. .................... 279/57; 279/50; 279/1 DC
[51] Int. Cl.² ......................................... B23B 31/20
[58] Field of Search ............... 27/19, 19.1, 19.2, 28, 27/29, 45, 46, 95, 96, 47, 50, 55, 57, 70, 69, 1 ME, 1 DA, 1 DC; 82/38 A, 38 R, 39; 403/368, 374

[56] References Cited
UNITED STATES PATENTS

| 2,372,592 | 3/1945 | Lovely | 279/1 DC |
| 2,471,921 | 5/1949 | Ashdown | 279/50 |
| 2,608,415 | 8/1952 | Drissner | 279/1 DC X |
| 3,533,639 | 10/1970 | Wright | 279/69 X |
| 3,727,930 | 4/1973 | Anderson | 279/50 |

*Primary Examiner*—Donald R. Schran
*Assistant Examiner*—W. R. Briggs
*Attorney, Agent, or Firm*—Thomas M. Farrell

[57] ABSTRACT

A collet-type work holder for supporting varied cross-sections of work stock, having substantially reduced self-locking tendencies, employing a plurality of rotatably mounted collet carriers, each having a set of tapered collets slidable within the collet carriers. The tapered collet sets are urged by springs into a clamping mode, and are unclamped by the action of frictional forces exerted on the collets by sliding work stock.

3 Claims, 7 Drawing Figures

COLLET-TYPE WORK HOLDER

BACKGROUND OF THE INVENTION

When machining long bar stock, (having round or hexagonal cross-sections, for example) which extends from the face of a work-holding chuck on a turning machine, it is desirable to support the work by means of a "steady rest" at or near the point of tool application, so as to prevent deflection and chatter of the work.

A common prior art "steady rest" comprises a shoe assembly which is fixed to the machine base, wherein the shoes are applied in a radial direction to the part surface. This application may be disadvantageous because the shoes do not locate on the work at a point nearest the tool application due to the clearances needed to move the tools and carriages about.

Applicant feels that one of the most advantageous places to locate a steady rest is to carry it on the movable tool carriage so support is always proximate to the point of tool application. However, the shoe-type steady rests are not feasible for this purpose because they cannot maintain close diametral fit and yet still permit the relative sliding between work and steady rest in reversing axial directions. Applicant further feels that a collet chuck would be a useful device for applying uniform diametral control to work stock, but existing collet chucks do not readily adapt to reverse axial movements.

Turning machines have long used collet-type chucks for clamping work stock while machining. The usual type of design arrangement is to have male and female conical rings, nesting inside one another, wherein the relative movement of the rings may cause a change in "working ring" diameter, which change may be useful to clamp work stock. Further, the working ring may be split, to permit ease of dimensional change.

The collet chuck has many advantages, such as the fact that it is relatively easy to actuate when rotating and, a mechanical advantage may be had from proper taper design. One feature inherent in tapered collet chucks which may act as a disadvantage, however, is the fact that they tend to be "self-locking" when work is slid across the tapered rings in one direction. Thus, work is slid unidirectionally through collet chucks as presently applied to turning machines.

The problems inherent in work-holding collet chucks, when relative sliding of chuck and workpiece is required in reversing directions, are obviated in a novel manner by the present invention.

It is an object, therefore, of the present invention to provide a collet-type work-holding chuck which is capable of close dimensional control yet will permit reverse directional sliding of workpiece relative to chuck.

Another object of the present invention is to provide a work-holding collect chuck which is self-contained and mechanically actuated.

SUMMARY OF THE INVENTION

This invention comprises a collet chuck used for supporting varied cross-sections of work stock on a turning machine, having a substantially reduced self-locking tendency when relative sliding between the collet chuck and workpiece occurs in reversing axial directions.

A housing is utilized which may be carried on a movable tool carriage, if desired, to present the collet chuck to the work at a position proximate to the tool application point. A pair of collet carriers are rotatably mounted within the ends of a bore through the housing, and a collet set comprising male and female tapered collet rings is positioned in each of the collet carriers. A collet biasing means, such as a spring, is used to urge the male and female members in preferred directions, relative to one another, which causes a diametral change in the ring supporting the workpiece and exerts a clamping, or "snugging," force on the work through part-specific jaws.

A thrust flange is provided within the center of the housing, coaxial with the bore and stataionary with respect thereto. The reaction ring is carried in each of the collet sets to provide a thrusting reaction face for the spring biasing means to urge clamping of the collet set. Further, a cam is pivotally mounted in each reaction ring to engage the thrust flange of the housing in such a manner as to attempt to pull the rings out of engagement with one another when frictional force is applied from a sliding workpiece against the collet set. Applied, in such a manner, the clamping load of the collet biasing means is relieved and the self-locking tendency of the tapered pair is substantially reduced.

DESCRIPTION OF THE PREFERRED EMBODIMENT

Figure 1:
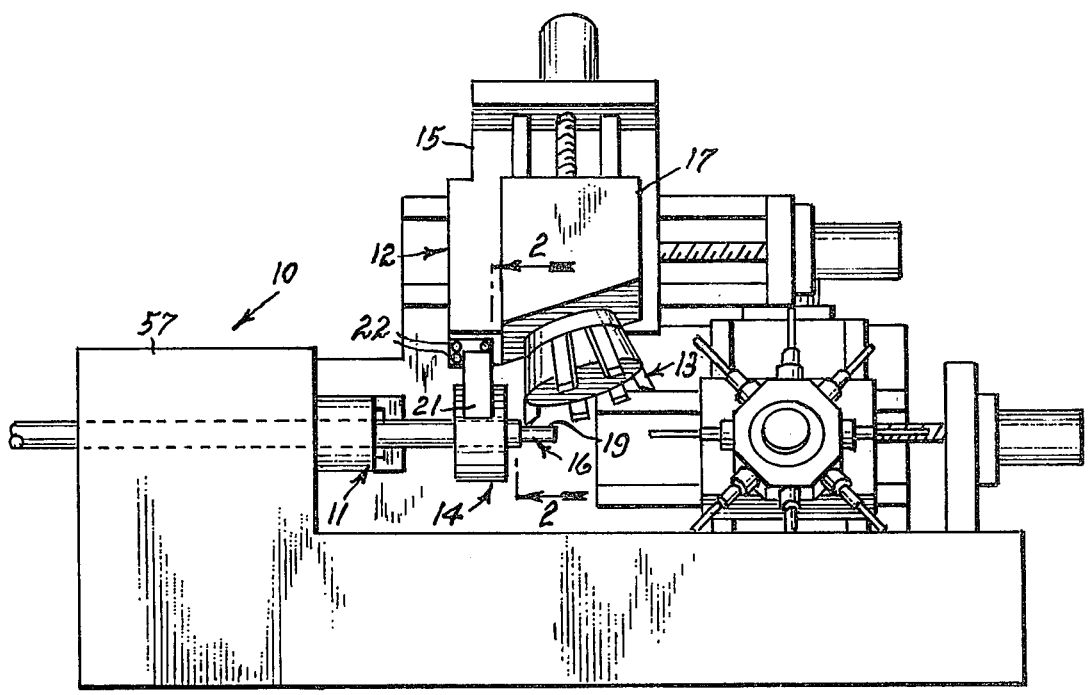
FIG. 1 is an elevational view of a turning machine showing a collet chuck assembly mounted to the movable tool carriage.

FIG. 1 depicts an elevational view of a turning machine 10 having a work support chuck 11 mounted to the headstock of the machine, and a tool slide assembly 12 which carries both cutting tools 13 and a movable collet chuck assembly 14. The tool slide assembly 12 is comprised of a first slide 15 which is movable along an axis parallel to the axis of the workstock 16, and a second slide 17 is movable on the first slide 15 along an axis substantially normal to the axis of the workstock 16. The second movable slide 17 carries turning tools 13 for performing operations on the workstock 16.

The collet chuck assembly 14 is carried by the first slide 15 such that workstock 16 may pass through the central bore 18 of the collet chuck assembly 14 and relative axial movement may thereafter take place between the workstock 16 and the collet chuck assembly 14. In the embodiment shown, the workstock 16 is held in a fixed axial position during machining operations performed by the turning tools 13 and the collet chuck assembly 14 is slid in reversing axial directions on the workstock 16 as the turning tools 13 are advanced to and retracted from the workstock surface 19. It is evident, however, that the relative movement may be obtained by holding the collet chuck assembly 14 and tools 13 in a fixed axial position relative to the stationary base 57, while workstock 16 is fed in reversing axial directions through the collet chuck assembly 14.

The collet chuck housing 21 is shown secured to the first tool slide 12 by screws 22, but the housing 21 may be made as an integral part of the first tool slide 12.

Figure 2:
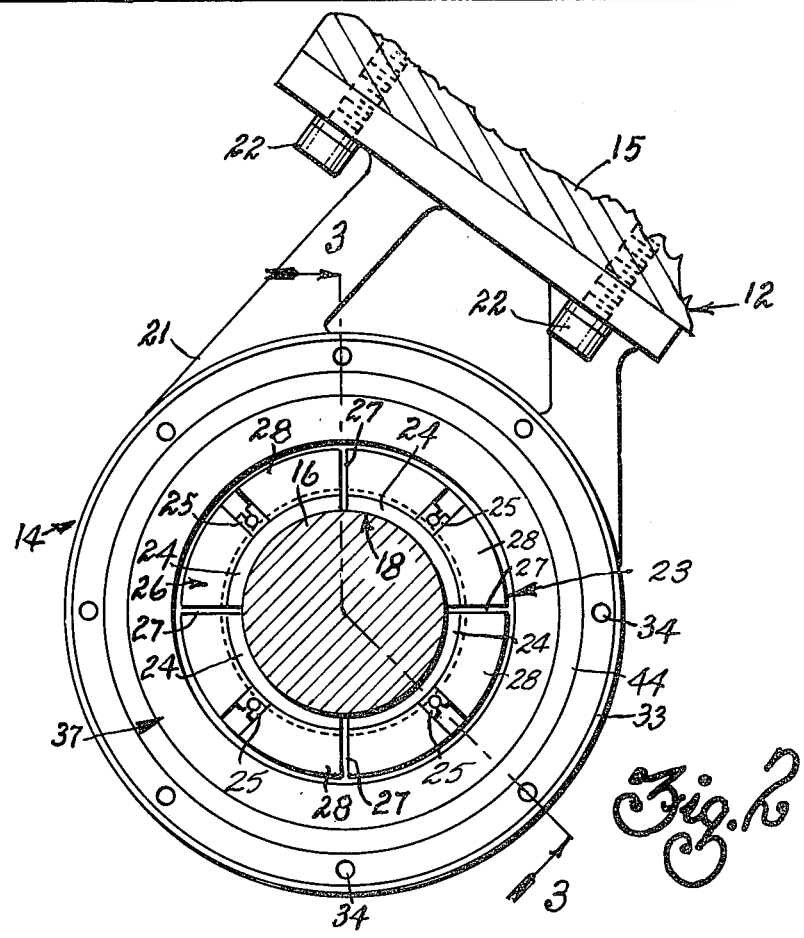
FIG. 2 is a front view of the collet chuck assembly taken in the direction of arrow 2 on FIG. 1.

Referring now to FIG. 2, a front view of the collet chuck assembly 14 is shown, depicting the housing 21, and the central bore 18 through the rotatable collets 23. Collet pads 24, which are removable, part-unique jaws, are shown secured in position by locking keys 25. Here is should be noted, that while the workstock 16 is depicted as having a circular cross-section, other cross-sections such as hexagons and squares, for example, may be handled by merely adapting the part-unique collet pads 24 to the workstock cross-section. The collet inner member 26 is shown with radial slots 27 cut through the collet inner member 26 so that an effective diametral change may be accomplished by allowing "give" to take place between the collet segments 28.

Figure 3:
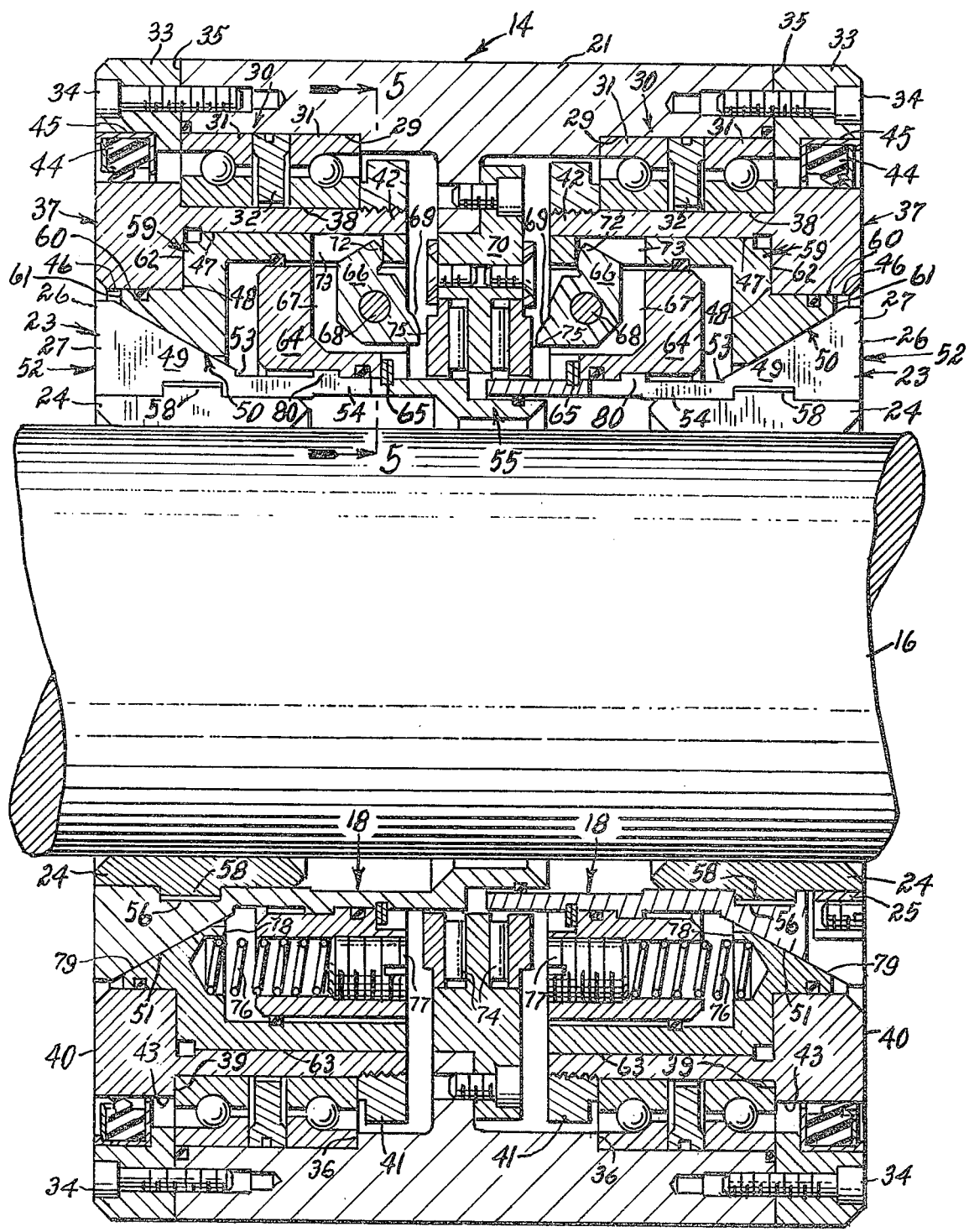
FIG. 3 is a section through the collet chuck assembly taken along the line 3—3 of FIG. 2.

FIG. 3 is an axial section taken through the collet chuck assembly 14 to show the working parts. The housing 21 has coaxial bores 29 in each end in which are received dual sets 30 of antifriction bearings 31. Each bearing set 30 is spread by a bearing spacer ring 32, and each bearing set 30 is clamped into its respective bore 29 by a bearing cap 33, which is secured by screws 34 to the face 35 of the housing 21 and captures the bearing set 30 and spacer ring 32 between the bearing cap 33 and the bottom 36 of the bearing bore 29.

A collet carrier 37 is located within the bore 38 of each bearing set 30 and is clamped to the bearing set 30 for rotation therewith by means of a shoulder 39 on the outer end 40 of the collet carrier 37 and a locknut 41 on the inner end 42 of the collet carrier 37 which is threadably received on the collet carrier 37 for snugging the carrier 37 to the bearing set 30. The collet carrier 37 has a smooth diameter 43 on its outer end which forms the shoulder 39, and a seal ring 44 is located in an outer counterbore 45 of the bearing cap 33 which effects sealing on the smooth diameter 43 of the rotatable collet carrier 37. The collet carrier 37 has a small-diameter bore 46 through its outer end 40, and a larger-diameter bore 47 at its inner end 42 which terminates at a shoulder 48 within the collet carrier 37.

A collet set 49 is slidably maintained within the collet carrier bores 46, 47 and is adapted for fixed rotation therewith and simultaneous relative axial movement. The collet set 49 is partially comprised of an inner member 26 having a frusto-conical portion 50; that is, having a locating taper 51 at its outboard end 52 with the base of the cone extending outward from the collet chuck assembly 14, while the inner, truncated end 53 of the cone meets a generally-cylindrical diameter portion 54 which extents toward the center 55 of the assembly 14. A central bore 18 is provided through the inner member 26 of the collet set 49 within which bore 18 an annular groove 56 is also provided to accurately locate and contain part-unique collet pads 24 by closely fitting a key-like ridge 58 of the pad 24 within the groove 56.

The collet set 49 is further comprised of an outer member 59 having a small diameter 60 at its outboard end 61 which is slidably adapted to fit in the small bore 46 of the collet carrier 37, and a shoulder 62 is formed at the small diameter 60 of the outer member 59 which intercepts the inboard, larger outer diameter 63 of the outer member 59. The outer diameter 63 of the outer member 59 is adapted for a smooth fit within the large bore 47 of the collet carrier 37. In operation, the shoulders 48 of the collet carriers 37 and shoulders 62 of the outer members 59 of the collet set 49 usually do not touch, as a slight clearance is provided between the two.

A reaction ring 64 is carried on the inner member 26 of the collet set 49 and is secured in position by the snap rings 65 shown, and the shoulder 80, for example, so that the inner member 26 of the collet set 49 and the reaction ring 64 move in unison.

A cam 66 is pivotally carried in the reaction ring 64 in a slot 67 which is provided to receive the cam 66, and a pin 68 is secured through the reaction ring 64 to establish a pivot for the cam 66. The cam 66 has a lower portion 69 extending inwardly toward a central thrust flange 70 which is secured to the housing 21 and is stationary with respect thereto, while the upper portion 72 of the cam 66 extends upward into a clearance slot 73 that defines a reaction surface in the outer member 59 of the collet set 49 in such a fashion that when a force is directed at the lower portion 69 of the cam 66 towards the collet set 49; pivoting of the cam 66 will cause a reverse force to be exerted at the top portion 72 of the cam 66 against the reaction surface defined by slot 73 and outer member 59 of the collet set 49.

Since the collet set 49, reaction ring 64, and cam 66 are rotatable with resepct to the stationary housing 21 and slidable with respect thereto, thrust bearings 74 are provided at the thrust flange faces 75 to minimize wear.

To provide clamping forces on workstock 16, compression springs 76 are used for collet biasing means and are located in seats 77 between the reaction ring 64 and the inner shoulder 78 of the outer member 59 of the collet sets 49. These compression springs 76 force the outer member 59 and the reaction ring 64 apart, and the relative axial motion of the two causes a cooperating locating taper 79 within the outer member 59 of the collet set 49 to move forward on the locating taper 51 of the inner member 26 of the collet set 49 and thereby effects a transfer of the relative axial movement into a dimetral change of the inner member 26. This diametral change forces the bore 18 of the inner member 26 and its respective collet pads 24 to impress a clamping force on the workstock 16.

OPERATION

Since each end of the collet chuck assembly 14 has a similarly adapted collet set 49 within respective collet carriers 37, it is seen that the collet pads 24 each end of the collet chuck assembly 14 clamp the workstock 16 when the workstock 16 is held in a fixed axial relationship to the chuck assembly 14. Thus, it is also seen that if the outer members 59 of the collet sets 49 were held in a fixed axial relation to the collet chuck housing, and relative sliding were attempted between the workstock 16 and the chuck assembly 14, the inner member 26 of the collet set 49 would be driven into the taper of the outer member and increased clamping or self-locking would occur.

Figure 4A:
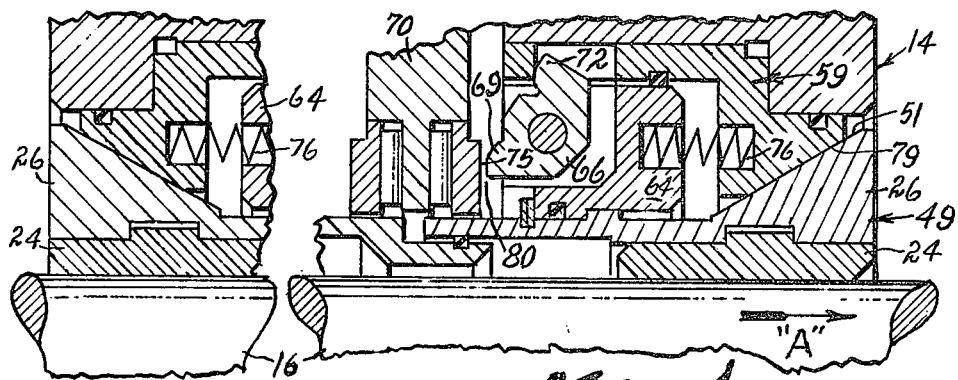
FIG. 4a is a section through a collet chuck assembly depicting a workpiece sliding out of the collet set.
Figures 4B, 5:
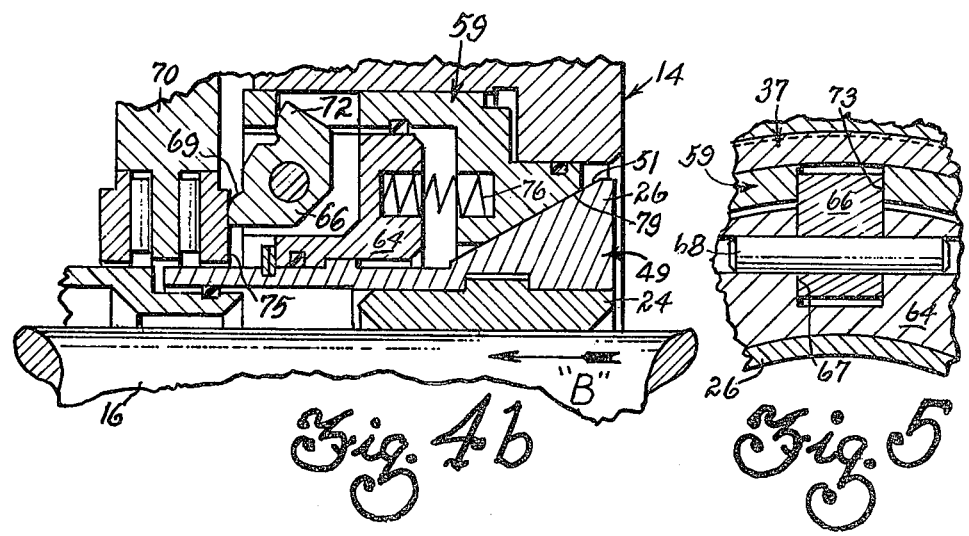
FIG. 4b is a section through a collet chuck assembly depicting a workpiece sliding into the collet set.
FIG. 5 is section taken along the line 5—5 of FIG. 3.
Figure 4C:
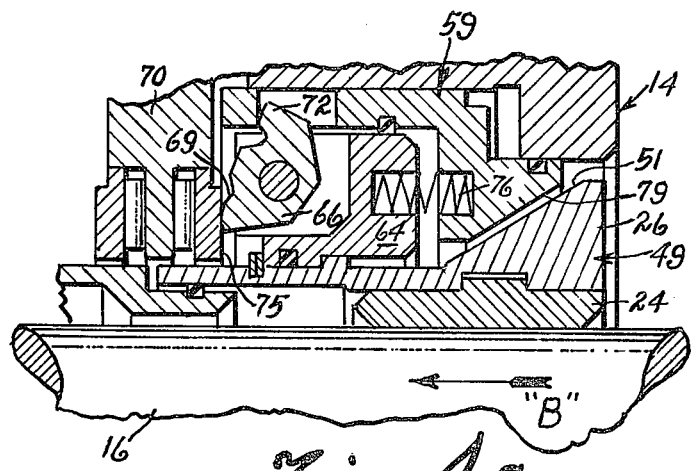
FIG. 4c is a section through a collet chuck assembly depicting a workpiece sliding into the collet set.

FIGS. 4a, 4b, and 4c depict the relative movement of the chuck parts during operation. For all practical purposes, the collet inner member 26, reaction ring 64 and collet pad 24 can be considered to be one member for functional viewing.

Also, since each end of the collet assembly 14 contains substantially indentical collet sets 49, only one end of the collet chuck assembly 14 need be shown, since the description of function of one end (FIGS. 4a, 4b, 4c) applies to the other end of the assembly 14.

As shown in FIG. 4a, when relative sliding takes place between the workstock 16 and the collet chuck assembly 14, (chuck stationary, and workstock slid in direction of arrow "A") the end of the collet chuck assembly 14 through which emerges workstock 16, is unaffected by the relative movement, and snugging is maintained by the spring biasing means. However, the end of the collet assembly 14 where the workstock 16 enters the assembly is susceptible to self-locking conditions because the frictional force at the interface of work pads 24 and workstock 16 tends to drive the inner member taper 51 into the outer member cooperating taper 50 and thereby self-lock.

Referring to FIG. 4b, the within invention substantially reduces the tendency to self-lock during a relative sliding mode by virtue of the fact that when workstock 16 is entering one face of the collet housing, (chuck assembly stationary and workstock slid in direction of arrow "B") that respective collet set 49 is transposed axially through a small clearance 80 toward the thrust flange 70 by the action of the frictional force at the interface of work pad 24 and work stock 16. At the instant that the lower portion 69 of the cam 66 strikes the thrust flange face 75, the upper portion 72 of the cam 66 tends to pull the outer member 59 of the collet set 49 toward the reaction ring 64 which is secured to the inner member 26 of the collet set, thereby compressing the biasing spring 76. In this manner, as additional movement takes place, as shown in FIG. 4c, the pivoting action of the cam 66 thus tends to separate the respective locating tapers 79, 51 of both the outer member 59 and inner member 26 of the collet set 49. By proper design of spring pressure, the "unloading" of the force between the collet members may reduce clamp force to any desired figure; even to zero. Thus, workstock 16 may be slid through the collet chuck assembly 14 without locking up the collet set 49 at the entrance face, while complete snugging on the stock, is maintained by the collet set 49 at the exit face of the collet chuck assembly 14.

When it is desired to move the stock in the opposite direction through the collet chuck assembly 14, the previously unloaded collet set 49 will now reload and snug against the workstock 16 while the previously snugged collet set 49 will be unloaded, or relieved of the principal amount of clamping force previously exerted.

What is claimed is:

1. A collet chuck having a substantially reduced self-locking tendency when a workpiece slides through the collet, comprising:
   a. a housing;
   b. first and second collet carriers, rotatably mounted within said housing;
   c. first and second collet sets, slidable within said collet carrier, each comprising an inner member having a locating taper and an outer member having a locating taper cooperating with said inner member;
   d. collect biasing means to urge said inner and outer members in a preferred direction for clamping;
   e. a thrust flange within said housing and stationary with respect thereto;
   f. a reaction ring carried by said inner member and a reaction surface defined in said outer member of said collet sets; and
   g. a plurality of cams, pivotal on said reaction ring, and engageable with said thrust flange and the reaction surface of said outer member of said collet sets and further wherein movement of said reaction ring carrying said cams causes the reaction of cam forces impressed on said thrust flange to be used to relieve the load of said collet biasing means.

2. The collet chuck of claim 1, wherein said collet biasing means comprises a plurality of springs disposed between said reaction ring and a flange portion on one of said inner and outer member of said collet sets.

3. The collet chuck of claim 1, wherein said thrust flange further comprises a rotatable face plate.

* * * * *